(12) United States Patent
Testin (10) Patent No.: US 9,722,894 B2
(45) Date of Patent: Aug. 1, 2017

(54) APPARATUS AND METHOD FOR PROVIDING OPERATIONAL STATUS FOR MULTIPLE COMMUNICATION NETWORKS

(71) Applicant: THOMSON LICENSING, Issy de Moulineaux (FR)

(72) Inventor: William Testin, Indianapolis, IN (US)

(73) Assignee: THOMSON LICENSING, Issy-de-Moulineaux (FR)

( * ) Notice: Subject to any disclaimer, the term of this patent is extended or adjusted under 35 U.S.C. 154(b) by 0 days.

(21) Appl. No.: 14/382,938

(22) PCT Filed: Dec. 12, 2012

(86) PCT No.: PCT/US2012/069070
§ 371 (c)(1),
(2) Date: Sep. 4, 2014

(87) PCT Pub. No.: WO2013/141909
PCT Pub. Date: Sep. 26, 2013

(65) Prior Publication Data
US 2015/0012648 A1    Jan. 8, 2015

Related U.S. Application Data

(60) Provisional application No. 61/613,527, filed on Mar. 21, 2012.

(51) Int. Cl.
*G06F 15/173* (2006.01)
*H04L 12/26* (2006.01)
(Continued)

(52) U.S. Cl.
CPC .......... *H04L 43/045* (2013.01); *H04L 12/283* (2013.01); *H04N 17/04* (2013.01); *H04L 12/2801* (2013.01); *H04L 43/0817* (2013.01)

(58) Field of Classification Search
CPC . H04L 43/045; H04L 12/283; H04L 43/0817; H04L 12/2801; H04N 17/04
See application file for complete search history.

(56) References Cited

U.S. PATENT DOCUMENTS

| 7,079,861 B2 † | 7/2006 | Critz |
| 2004/0179505 A1* | 9/2004 | Critz ..................... H04W 24/00 370/338 |

(Continued)

FOREIGN PATENT DOCUMENTS

| JP | 11-191785 A | 7/1999 |
| JP | 2007-199182 A | 8/2007 |

(Continued)

OTHER PUBLICATIONS

Search report dated Mar. 1, 2013.

*Primary Examiner* — Padma Mundur
(74) *Attorney, Agent, or Firm* — Brian J. Dorini; Michael A. Pugel; Ivonete Markman (57) ABSTRACT

An apparatus and method for providing operational status for multiple communication networks is described. The apparatus includes a first transceiver circuit configured to communicate with first devices using a first communication network medium and including a visual indicator representing the status of communication, a second transceiver circuit configured to communicate with a plurality of second devices using a second communication network medium, and a controller determining the status of communication between the apparatus and the plurality of second devices and providing the status to the visual indicator. The method includes determining if a device is operating in a first communication network, determining if the device is operating in a second communication network, and displaying a visual indication that the device is operating in the first communication network using a visual indicator on the (Continued)

device, the visual indicator being shared by the first communication network and the second communication network.

22 Claims, 4 Drawing Sheets

(51) Int. Cl.
*H04L 12/28* (2006.01)
*H04N 17/04* (2006.01)

(56) References Cited

U.S. PATENT DOCUMENTS

| | | | |
|---|---|---|---|
| 2007/0217436 A1* | 9/2007 | Markley | H04L 12/2803 370/401 |
| 2010/0313225 A1 | 12/2010 | Cholas et al. | |
| 2011/0167466 A1 | 7/2011 | Aiouaz et al. | |
| 2011/0185370 A1 | 7/2011 | Tamir et al. | |

FOREIGN PATENT DOCUMENTS

| | | |
|---|---|---|
| JP | 2008-017141 A | 1/2008 |
| JP | 2008-193303 A | 8/2008 |
| WO | WO0180501 | 10/2001 |
| WO | WO2010099119 | 9/2010 |
| WO | WO2010099229 | 9/2010 |
| WO | 2010-144453 A1 | 12/2010 |

\* cited by examiner
† cited by third party

APPARATUS AND METHOD FOR PROVIDING OPERATIONAL STATUS FOR MULTIPLE COMMUNICATION NETWORKS

REFERENCE TO RELATED PROVISIONAL APPLICATION

This application claims the benefit, under 35 U.S.C. §365 of International Application PCT/US2012/0069070, filed Dec. 12, 2012, which was published in accordance with PCT Article 21(2) on Sept. 26, 2013 in English which claims the benefit of U.S. provisional application No. 61/613,527 filed on Mar. 21, 2012.

TECHNICAL FIELD OF THE INVENTION

The present disclosure generally relates to systems that monitor operational status of networks and, more specifically, to an apparatus and method for providing operational status for multiple communication networks.

BACKGROUND OF THE INVENTION

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Many home entertainment devices not only include the capability to receive and/or process available media content but also include the ability to communicate with other devices in a home network. These devices often include, but are not limited to, set-top boxes, gateways, televisions, home computers, and the like. Further, many of these devices may include multiple interfaces for different types of home networks. For example, a set-top box used for receiving audio and video content from a satellite service provider may include an Ethernet interface for communicating in a wired home Ethernet network and also include an interface for communicating over a co-axial cable using the Multimedia over Cable Alliance (MoCA) standard. The MoCA interface allows separate audio and video signals to be communicated to additional signal receiving devices in a home network using the same wiring (e.g., co-axial cable) used for receiving a broadcast signal.

During operation of a home entertainment device in a home network, it may be important to have an indicator of operational status of the network communication of the home entertainment device (e.g., a set-top box or a gateway) for either monitoring or troubleshooting purposes. The standard physical interface connector used for Ethernet communications typically includes two status light indicators in the connector. However, similar indicators for other communication network interfaces (e.g., MoCA communication) are typically not present. Identifying and troubleshooting connection and/or communication issues in these other networks is hindered by not having some type of indicator for the user to determine whether there is either a "link", or connection made, to another device. Identification and troubleshooting may further be hindered by not having an additional indicator for whether there is "activity", or data being transferred, to or from the other device. In particular, no standard location or function appears to be used for providing MoCA communication status indicators. As a result, a typical user of a device using network communication other than Ethernet (e.g., MoCA) does not have easy access to the link or activity information in order to identify and/or troubleshoot communication activity and/or issues.

In some cases, communication status indication for a network may be included as part of the user interface for the device. However, this user interface based status information may not be readily available without navigating through several layers of the user interface menu structure. Additionally, separate light indicators may be added to the product design on either the front bezel or the rear panel on the set top box. However, the additional indicators result in an added expense and have not been commonly done. Therefore, there is a need for a simple, convenient operational status indicator system for multiple network communication. Therefore, there is a need for monitoring and providing operational status for multiple communication networks. In particular, there is a need for a cost effective approach to providing an operational status indicator for in a first communication network, such as a MoCA network, in conjunction with operation and status in a second network, such as an Ethernet network.

SUMMARY

According to an aspect of the present disclosure, an apparatus for providing operational status for multiple communication networks is described. The apparatus includes a first transceiver circuit, the first transceiver circuit configured to communicate with a plurality of first devices using a first communication network medium, the first transceiver circuit also including a visual indicator representing the status of communication between the apparatus and the plurality of first devices, a second transceiver circuit, the second transceiver circuit configured to communicate with a plurality of second devices using a second communication network medium, and a controller coupled to the first transceiver circuit and the second transceiver circuit, the controller determining the status of communication between the apparatus and the plurality of second devices and providing the status to the visual indicator of the first transceiver circuit.

According to another aspect of the present disclosure, a method for providing operational status for multiple communication networks is described. The method includes determining if a device is operating in a first communication network, determining if the device is operating in a second communication network, and displaying a visual indication that the device is operating in the first communication network using a visual indicator on the device if the device is operating in the first communication network, wherein the visual indicator is shared by the first communication network and the second communication network.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

It should be understood that the drawing(s) are for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The embodiments of the present disclosure are related to providing status indicators on a device that include the capability to operate with multiple home communication networks. In particular, the embodiments disclose an apparatus and method for sharing the operation of status indicators used for a first communications network (e.g., an Ethernet network) with a second network (e.g., a MoCA network). The embodiments share the use of the "Link" and "Activity" indicator lights (e.g., light emitting diodes (LEDs)) used as part of device interface for the first network to also indicate "Link" and "Activity" for the second network.

The present disclosure is directed at the problem of providing communication status indicators on a device capable of communicating using more than one communication network. More specifically embodiments are directed at an apparatus and method that permits the sharing of network status indicators on the device that operates on a plurality of communications networks that further operates across separate physical communication media. In particular, one or more embodiments describe the shared use of the Ethernet "Link" and "Activity" status lights, or LEDs, by the separately operable MoCA network operating on a co-axial cable home network. Further, one or more embodiments describe either independent control of the status indicators for operation of the communication networks or simultaneous control of the status indicator for operation in both networks.

Figure 1:
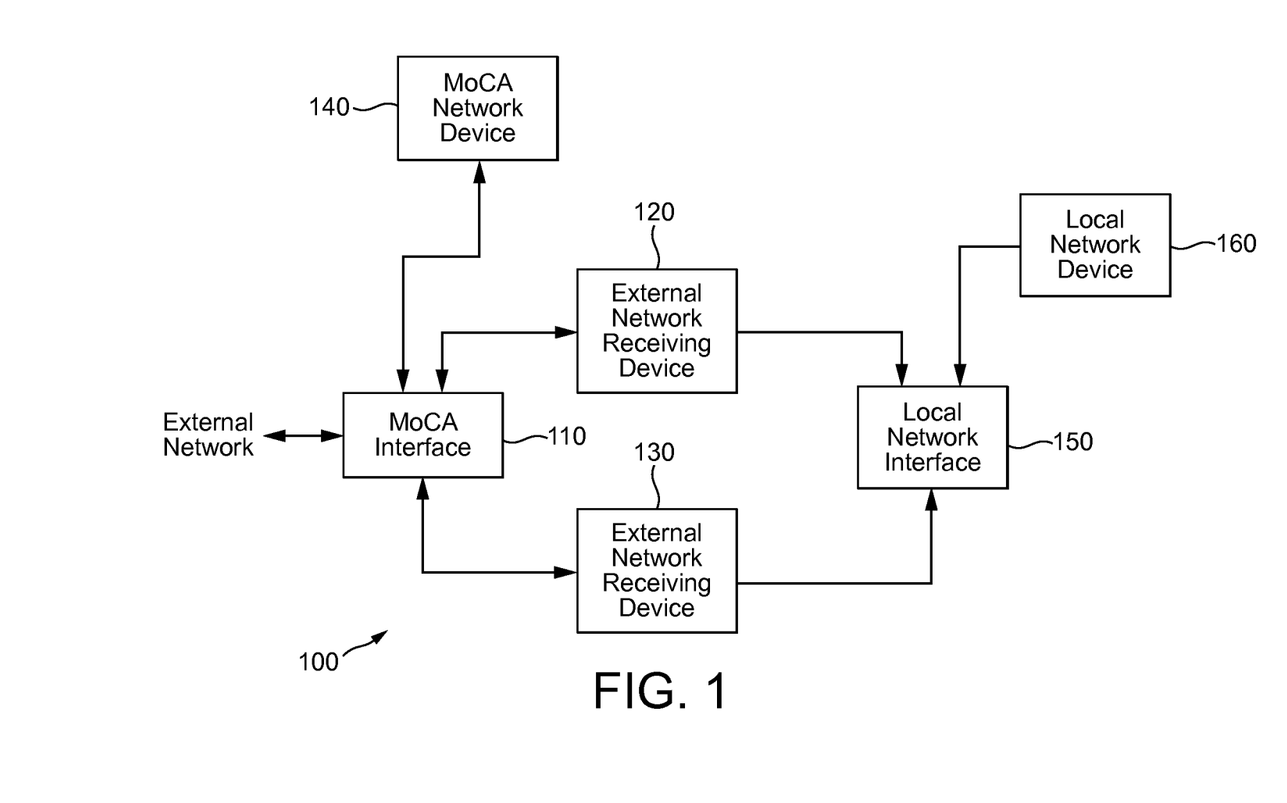
FIG. 1 is a block diagram of an exemplary signal receiving device in accordance with the present disclosure.

Turning now to FIG. 1, a block diagram of an embodiment of a system 100 for providing media content in a home, or end user, network is shown. The media content, originating from a content provider, is provided through an external network to a MoCA interface 110. The media content may be provided using any one of the standard transmission protocols and standards for content delivery (e.g., Advanced Television Systems Committee (ATSC) A/53, digital video broadcast (DVB)-Cable (DVB-C), DVB-Satellite (DVB-S), or DVB-Terrestrial (DVB-T)). MoCA interface 110 is connected to external network receiving device 120, external network receiving device 130, and MoCA network device 140. Both external network receiving device 120 and external network receiving device 130 connect to local network interface 150. Local network interface 150 connects to local network device 160. The components shown in system 100 comprise a home network configured to provide media content to multiple locations within the home using one or more home communication networks.

A signal, containing media content (e.g., audio, video, and/or data) from the external network is provided over a physical media, such as co-axial cable. The external network interfaces to MoCA interface 110. MoCA interface 110 provides a routing mechanism for the signal from the external network to devices in the home or user network (e.g., external network receiving device 120 and external network receiving device 130) in conjunction with signals that operate in the MoCA network with the home or user network. Moca interface 110 may include active or passive circuit elements that may split or separate the input signal into different or identical output signals. Moca interface 110 may use amplifiers, frequency filters, and electromagnetic circuits to split or separate the signal. In one embodiment, the external network provides a signal on a co-axial cable between the frequency range of 20 Megahertz (Mhz) and 800 Mhz. The MoCA network operates using signals in the frequency range from 950 Mhz to 1250 Mhz. MoCA interface 110 provides a signal splitting for signals from the external network and a separate signal splitting for signals on the MoCA network while preventing signals from the MoCA network from being output to the external network.

External network receiving device 120 and external network receiving device 130 may each operate and function in a similar manner. External network receiving device 120 and external network receiving device 130 receive the signal from the external network through the MoCA interface 110. External network receiving device 120 and external network receiving device 130 may receive different types of media content (e.g., different channels) from either the external network or from other devices in the home network through either MoCA interface 110 or local network interface 150. External network receiving devices 120 and 130 tune, demodulate, decode, and process the content for display and use by a user in the home. External network receiving devices 120 and 130 may further provide a separation of the media content based on instructions provided with the content or over the external network. External network receiving devices 120 and 130 may also process and separate media content based on instructions received via user commands. External network receiving devices 120 and 130 may also provide storage, such as a hard drive or optical disk drive, for recording and/or storing the media content as well as providing the content for playback to other devices in a home network (e.g., MoCA network device 140 and local network device 160). The operation and function of an external network receiving device, such as discussed here, will be described in further detail below. External network receiving devices 120 and 130 may be one of a settop box, home media server, computer media station, home network gateway, multimedia player, modem, router, home network appliance, or the like.

External network receiving devices 120 and 130 provide interfaces for communicating signals on the MoCA network through MoCA interface 110 to and from other MoCA network devices (e.g., external network receiving devices 120 and 130 and MoCA network device 140). External network receiving devices 120 and 130 also provide interfaces to a local home network through local network interface 150 to local network device 160. It is important to note that the MoCA network, as a first network, and the local network, as a second network, are different and unique networks for communicating signals within a user's home. In one embodiment, the second local network is Ethernet. In addition, the second network may be a wireless network. Wireless communication using a wireless network may include physical interfaces to accommodate one or more wireless formats including Wi-Fi, Institute of Electrical and Electronics Engineers standard IEEE 802.11 or other similar wireless communications protocols.

MoCA interface 110 provides MoCA network signals between either external network receiving devices 120 or 130 and MoCA network device 140. MoCA network device 140 tunes, demodulates, and decodes MoCA signals for display and use by a user. MoCA network device 140 may also transmit or communicate signals on the MoCA network for delivery to other devices (e.g., external network receiving device 120 or 130). These signals may provide control or identification information for media content to be delivered to the MoCA network device 140. The MoCA network device 140 is often referred to a thin client MoCA device and may be, but is not limited to, a computer device, tablet, display device, television, wireless phone, personal digital assistant (PDA), gaming platform, remote control, multi-media player, or home networking appliance that includes a MoCA interface, and may further include a storage media for digital video recording. MoCA network device 140 may also include a storage device, such as a hard drive or optical disk drive, for recording and playing back audio and video content.

Local network interface 150 provides the routing and signal communication and management functions between devices communicating across the local network. In one embodiment, local network interface 150 operates as a signal router for communicating using internet protocol routing protocols as part of an Ethernet network.

Local network interface 150 provides local network signals between either external network receiving devices 120 or 130 and local network device 160. Local network device 160 also may tune, demodulate, and/or decode the local network signals for display and use by a user depending on the communication protocol used. Local network device 160 may also transmit or communicate signals on the local network for delivery to other devices (e.g., external network receiving device 120 or 130). These signals may provide control or identification information for media content to be delivered to the local network device 160. The local network device 160 is often referred to a thin client device and may be, but is not limited to, a computer device, tablet, display device, television, wireless phone, personal digital assistant (PDA), gaming platform, remote control, multi-media player, or home networking appliance that includes a local network interface. Local network device 160 may further include a storage media for digital media recording.

It is important to note that any of external network receiving devices 120 and 130, MoCA network device 140, and local network device 160 may include display capability or may be connected to one or more display devices, not shown. The display devices may be conventional two-dimensional (2-D) type displays or may alternatively be advanced three-dimensional (3-D) type displays. It should be appreciated that other devices having display capabilities including, but not limited to, computer devices, tablets, gateways, display devices, televisions, wireless phones, PDAs, computers, gaming platforms, remote controls, multi-media players, home networking appliances or the like, may employ the teachings of the present disclosure and are considered within the scope of the present disclosure.

In operation, system 100 provides the networking and communication capability for connecting and sharing media content between devices in a user's home using either the MoCA network or the local network or both. In one embodiment, media content for a particular program is tuned by external network receiving device 120 and provided to MoCA network device 140 through MoCA interface 110. External receiving device 130 may also receive a second program provided by the external network and record the program to a recording media. At another point in time, the user of local network device 160 desires to view the second program and requests the program over the local network through local network interface 150. External network receiving device 130 responds to the request and provides the second program to local network device 160 through local network interface 150. Other embodiments related to the sharing and distribution of media content in a home network using more than one physical communication network are also possible.

It should be appreciated by one skilled in the art that system 100 in FIG. 1 is described primarily as operating with a local MoCA network and a second local network, such as an Ethernet network. However, other network standards that incorporate either a wired or wireless physical interface may be used. For instance, the second local network may be wireless network using WiFi, Bluetooth, or IEEE 802.11. Other wired networks, such as phone line or power line networks, may be used in place of the MoCA network. Further, more than two networks may be used either in an alternative fashion or simultaneously together.

Figure 2:
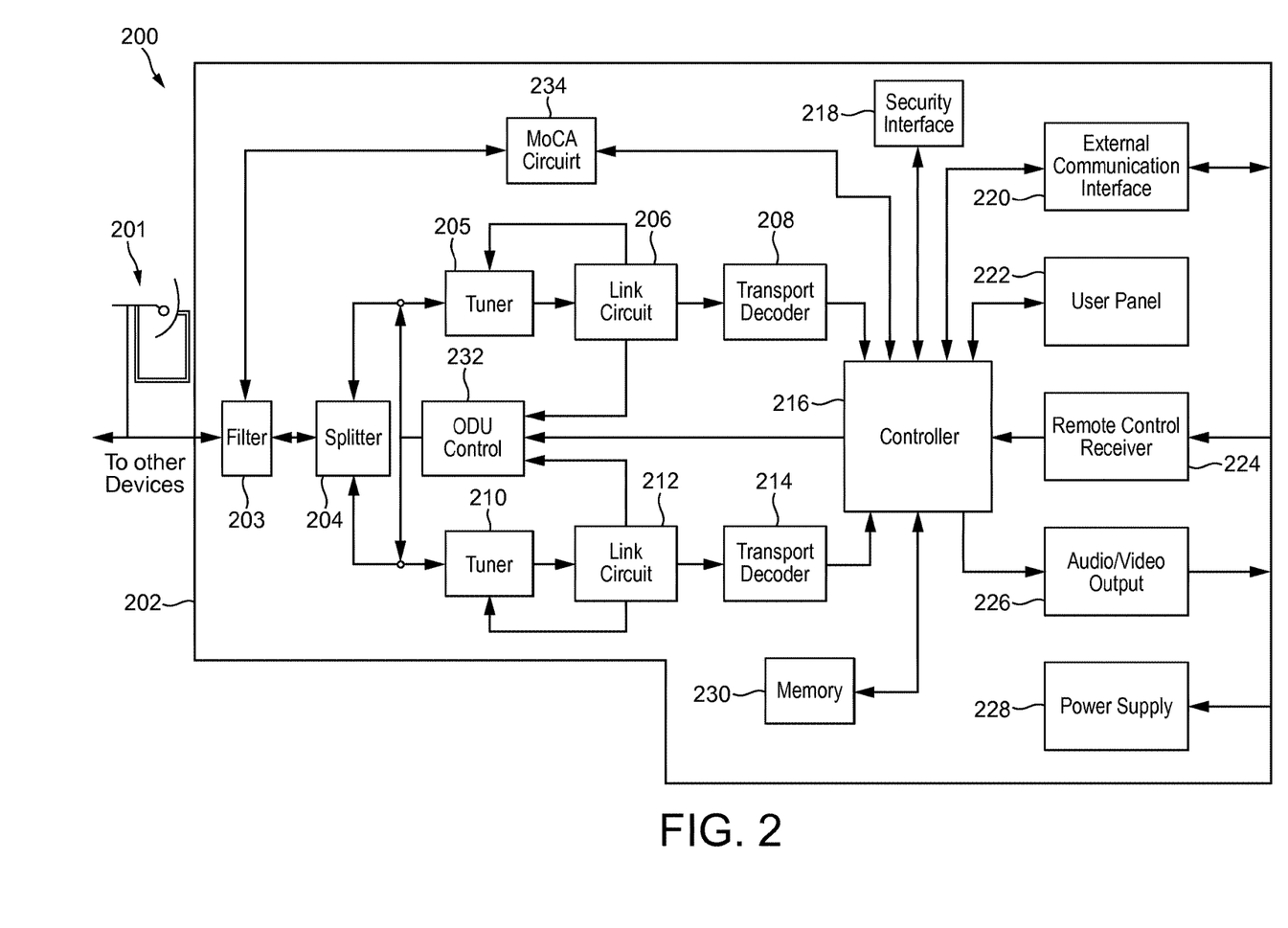
FIG. 2 is a block diagram of an exemplary signal receiving system in accordance with the present disclosure.

Turning now to FIG. 2, a block diagram of an exemplary embodiment of a signal receiving device 200 using aspects of the present invention is shown. Signal receiving device 200 operates in a manner similar to external network receiving device 120 and external network receiving device 130 described in FIG. 1. Signal receiving device 200 primarily receives signals from one or more satellites. The signals are provided by a service provider and represent broadcast audio and video programs and content. Signal receiving device 200 is described as including components that reside both inside and outside a user's premises. It is important to note that one or more components in signal receiving device 200 may be moved from inside to outside the premises. Further, one or more components may be integrated with a display device, such as a television or display monitor (not shown). In either case, several components and interconnections necessary for complete operation of signal receiving device 200 are not shown in the interest of conciseness, as the components not shown are well known to those skilled in the art.

An outdoor unit (ODU) 201 receives signals from the satellite through an over the air near earth orbit communications link. ODU 201 is connected to set top box 202. Within set top box 202, the input is connected to filter 203. Filter 203 connects to splitter 204. Splitter 204 connects to two signal processing paths. A first path includes tuner 205, link circuit 206, and transport decoder 208 connected together serially. A second path includes tuner 210, link circuit 212, and transport decoder 214 connected together serially. The outputs of transport decoder 208 and transport decoder 214 each connect to controller 216. Controller 216 connects to security interface 218, external communication interface 220, user panel 222, remote control receiver 224, audio/video output 226, power supply 228, memory 230, and ODU control 232. External communication interface 220, remote control receiver 224, audio/video output 226, and power supply 228 provide external interfaces for the set top box 202. ODU control 232 also connects to the splitter 203. Filter 203 also connects to MoCA circuit 234. MoCA circuit 234 further connects to controller 216.

Satellite signal streams, each containing a plurality of channels, are received by ODU 201. ODU 201 includes a dish for capturing and focusing the propagated radio wave from the atmosphere onto one or more antennas contained within a structure known as a low noise block converter (LNB). ODU 201 may be configured to receive the signal streams from satellite transponders located on one or more satellites. In a preferred embodiment, two sets of sixteen channels are received by ODU 201, and converted, using one or more LNBs to a frequency range of 950 Megahertz (MHz) to 2,150 MHz, referred to as L-band.

ODU 201 provides a converted signal stream to the set top box 202 through RF co-axial cable. The converted signal stream is provided to filter 203. The frequency response properties of filter 203 include a separate high pass filter and low pass filter such that the frequency pass bands of each do not overlap. The arrangement, often referred to as a diplexer, allows for a separation, through signal filtering, of the incoming satellite signal from the MoCA signal. In a preferred embodiment, the low pass filter frequency response pass band ends at a frequency below 900 MHz. Low pass filter a MoCA signal in a frequency range from 475 MHz to 625 MHz to pass through to subsequent blocks while attenuating, or not passing through, a satellite signal in a frequency range from 950 MHz to 2,150 MHz. High pass filter 220 operates in an opposite manner passing the satellite signal through and attenuating the SWM signal and MoCA signal.

The output signal from the high pass filter portion of filter 203 is provided to splitter 204. Splitter 204 splits, or divides, the incoming converted signal stream into two separate signal streams. Splitter 204 operates on the converted signal streams at radio frequencies and must provide a splitting of the signal power that is present at the input of splitter 204. Splitter 204 also maintains proper input and output operating impedances across the entire range of operating frequencies. In one embodiment, splitter 204 splits the converted signal stream into two signal streams having between three decibels (dB) and five dB of signal insertion loss and having an operating impedance of 75 ohms at the input and both outputs.

Each of the separate split signal streams from splitter 204 is processed in a separate signal processing path. The upper signal path contains a tuner 205, a link circuit 206, and a transport decoder 208 with the signal path connected in a serial fashion. The lower path also contains a tuner 210, a link circuit 212, and a transport decoder 214 with the signal path also connected in a serial fashion. Each processing path may perform essentially identical signal processing on one of the split signal streams. Therefore only the upper signal processing path will be further described here.

The upper split signal stream from splitter 204 is provided to tuner 205. Tuner 205 processes the split signal stream by selecting or tuning one of the channels in the split signal stream to produce one or more baseband signals. Tuner 205 contains circuits (e.g., amplifiers, filters, mixers, and oscillators) for amplifying, filtering and frequency converting the split signal stream. Tuner 205 typically is controlled or adjusted by link circuit 206. Alternately, tuner 205 may be controlled by another controller, such as controller 216, which will be described later. The control commands include commands for changing the frequency of an oscillator used with a mixer in tuner 205 to perform the frequency conversion.

Typically the baseband signals at the output of tuner 205 may collectively be referred to as the desired received signal and represent one satellite channel selected out of a group of channels that were received as the input signal stream.

Although the signal is described as a baseband signal, this signal may actually be positioned at a frequency that is only near to baseband.

The one or more baseband signals from tuner 205 are provided to link circuit 206. Link circuit 206 typically contains the processing circuits needed to convert the one or more baseband signals into a digital signal for demodulation by the remaining circuitry of link circuit 206. In one embodiment the digital signal may represent a digital version of the one or more baseband signals. In another embodiment the digital signal may represent the vector form of the one or more baseband signals. Link circuit 206 also demodulates and performs error correction on the digital signal to produce a transport signal. The transport signal may represent a data stream for one program, often referred to as a single program transport streams (SPTS), or it may represent multiple program streams multiplexed together, referred to as a multiple program transport stream (MPTS).

The transport signal is provided to transport decoder 208. Transport decoder 208 typically separates the transport signal, which is provided as either a SPTS or MPTS, into individual program streams and control signals. Transport decoder 208 also decodes the program streams, and creates audio and video signals from these decoded program streams. In one embodiment, transport decoder 208 is directed by user inputs or through a controller such as controller 216 to decode only the one program stream that has been selected by a user and create only one audio and video signal corresponding to this one decoded program stream. In another embodiment, transport decoder 208 may be directed to decode all of the available program streams and then create one more audio and video signals depending on user request.

The audio and video signals, along with any necessary control signals, from both transport decoder 208 and transport decoder 214 are provided to controller 216. Controller 216 manages the routing and interfacing of the audio, video, and control signals and, further, controls various functions within set top box 202. For example, the audio and video signals from transport decoder 208 may be routed through controller 216 to an audio/video (AN) output 226. AN output 226 supplies the audio and video signals from set top box 202 for use by external devices (e.g., televisions, display monitors, and computers). Also, the audio and video signals from transport decoder 214 may be routed through controller 216 to memory block 230 for recording and storage. Memory block 230 may contain several forms of memory including one or more large capacity integrated electronic memories, such as static random access memory (SRAM), dynamic RAM (DRAM), or hard storage media, such as a hard disk drive or an interchangeable optical disk storage system (e.g., compact disk drive or digital video disk drive). Memory block 230 may include a memory section for storage of instructions and data used by controller 216 as well as a memory section for audio and video signal storage. Controller 216 may also allow storage of signals in memory block 230 in an alternate form (e.g., an MPTS or SPTS from transport decoder 208 or transport decoder 214).

Controller 216 is also connected to an external communications interface 220. External communication interface 220 provides signals for establishing billing and use of the service provider content. External communications interface 220 may include a phone modem for providing phone connection to a service provider. External communications interface 220 also includes an interface for connection to an Ethernet network. The Ethernet network may be used for communication data, audio, and/or video signals and content to and from other devices connected to the Ethernet network (e.g., other media devices in a home).

Controller 216 also connects to a security interface 218 for communicating signals that manage and authorize use of the audio/video signals and for preventing unauthorized use. Security interface 218 may include a removable security device, such as a smart card. User control is accomplished through user panel 222, for providing a direct input of user commands to control the set top box and remote control receiver 224, for receiving commands from an external remote control device. Although not shown, controller 216 may also connect to the tuners 205, 210, link circuits 206, 212, and transport decoders 208, 214 to provide initialization and set-up information in addition to passing control information between the blocks. Finally, power supply 228 typically connects to all of the blocks in set top box 202 and supplies the power to those blocks as well as providing power to any of the elements needing power externally, such as the ODU 201.

Controller 216 also controls ODU control 232. ODU control 232 provides the signaling and power supply signals back to the ODU 201 by providing these signals onto the co-axial cable(s) running between ODU 201 and set top box 202. In one embodiment, the ODU control 232 receives input control signals from controller 216 and provides different DC voltage levels to specific portions of the ODU 201 to provide a certain signal stream containing a set of programs or content to splitter 203 and further to tuner 205 and tuner 210. In another embodiment, the ODU control 232 receives inputs from controller 216 and also from link circuit 206 and link circuit 212 and provides DC voltage levels and a separate tuning control signal to ODU 201 using low frequency carrier based frequency shift keying modulation. Controller 216 also may send control commands to disable ODU controller 230 from providing either direct current (DC) voltages or control signals to ODU 201.

MoCA circuit 234 amplifies and processes the MoCA signal both for reception and transmission. As described above the MoCA interface permits communications of audio and video signals in a home network and may operate bi-directionally. MoCA circuit 234 includes a low noise amplifier for improving reception performance of a MoCA signal received by signal receiving device 200 from another network connected device. The received and amplified signal is tuned, demodulated, and decoded. The decoded signal may be provided to a number of other circuits, including audio and video outputs as well as a mass storage device (e.g., hard disk drive, optical drive, and the like), not shown. Additionally, MoCA circuit 234 generates and formats the MoCA transmit signal using audio and video content available in signal receiving device, including content received from the input (e.g., satellite signal) and content from the mass storage device. MoCA circuit 234 also includes a power amplifier for increasing the transmitted signal level of the MoCA signal sent by signal receiving device 200 to another network connected device. Adjustment of the receive signal amplification as well as the transmit signal amplification in MoCA circuit 234 may be controlled by controller 216.

In operation, signal receiving device 200 may provide operation in one or another or both modes of local or home network communication. Further, the operational status for the device in each of the networks may be provided using one or more status indicator lights included on the device. In a preferred embodiment, the status indicators may provide communication status for operation, connection, and communication in a network using Ethernet communications.

The status indicators may also provide communication status for operation, connection, and communication in a network using MoCA communications. It is important to note that each of these networks do not operate using the same physical network or medium. For instance, the MoCA network operates using co-axial cable and phone or Ethernet network connected to external communication interface 220 operates on twisted pair cable similar to telephone cable. Each of the networks may be physically connected to the same of additional devices connected to the network or they may be physically connected to different sets of devices. In either case, the communication on the network may be non-overlapping and further may operate at different network communication speeds. Further, signal receiving device 200 may share a common set of status indicator lights for use with both networks. The use of a single set of status indicator lights for more than one network is advantageous for lower product cost and component re-use within the signal receiving device 200.

It should be appreciated by one skilled in the art that the blocks described inside set top box 202 have important interrelations, and some blocks may be combined and/or rearranged and still provide the same basic overall functionality. For example, transport decoder 208 and transport decoder 214 may be combined and further integrated along with some or all of the functions of controller 216 into a System on a Chip (SoC) that operates as the main controller for set top box 202. Further, control of various functions may be distributed or allocated based on specific design applications and requirements. As an example, the processing paths for the two input signal streams may operate for specific types of signals. Tuner 205, link circuit 206, and transport decoder 208 may receive, demodulate, and decode satellite signals containing content in high definition audio and video formats while tuner 210, link circuit 212, and transport decoder 214 may receive, demodulate, and decode signals containing data for maintaining the operation of a program guide.

Although set top box 202 is described above as receiving a single converted signal stream, set top box 202 may also be configured to receive two or more separate converted signal streams supplied by ODU 201 in some modes of operation. Operation in these modes may include additional components including switches and/or further tuning and signal receiving components, not shown.

Figure 3:
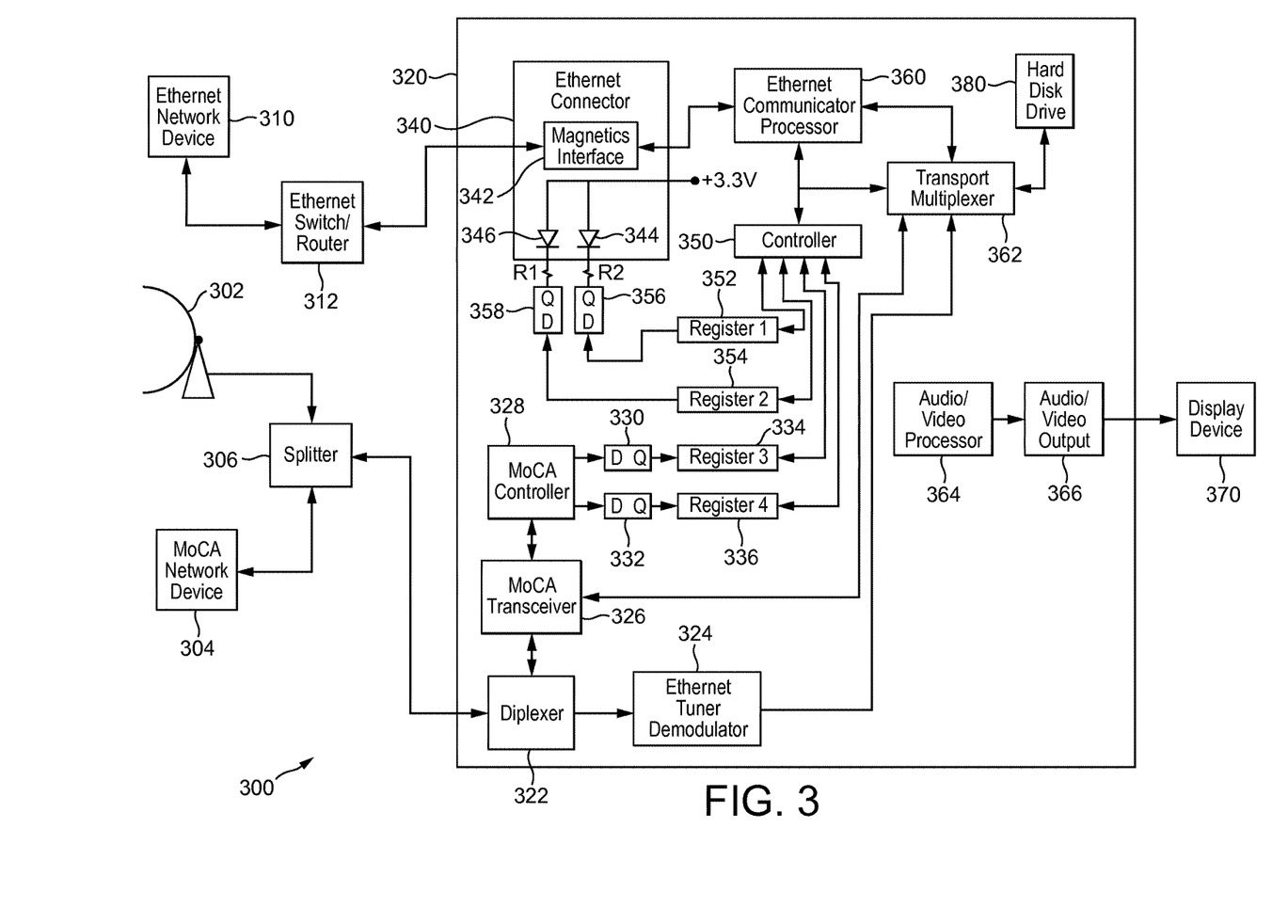
FIG. 3 is a block diagram of an exemplary network device in accordance with the present disclosure.

Turning to FIG. 3, an exemplary embodiment of another receiving system 300 including a signal communication status indicator system according to the present disclosure is shown. Receiving system 300 may be used in a signal receiving and communication system that includes the capability of providing data, audio, and/or video content over more than one network interface (e.g., more than one home network). Several components and interconnections necessary for complete operation of receiving system 300 are not shown in the interest of conciseness, as the components not shown are well known to those skilled in the art.

Receiving device 300 includes a signal receiving device 320 connected to several external communication devices. Signal receiving device 320 connects to an Ethernet switch/router 312 and further to an Ethernet network device 310. Signal receiving device 320 also connects to a splitter 306 and further to a MoCA network device 304. A satellite receiving dish/circuit 302 is also connected to splitter 306.

Signal receiving device 320 includes components for processing broadcast signals, such as satellite signals provided through satellite dish 302 and splitter 306. Signal receiving device 320 also includes components for processing audio, video, and data communications signals from an Ethernet network (e.g., Ethernet network device 310 and Ethernet switch/router 312) as well as a MoCA network (e.g., MoCA network device 304 and splitter 306).

The MoCA and satellite signal interface for signal receiving system 300, using a co-axial cable (e.g., RG-6 type cable), is connected to diplexer 322. Diplexer 322 connects to satellite tuner demodulator 324 and also connects to MoCA transceiver 326. Satellite tuner demodulator 324 connects to transport multiplexer 362. MoCA transceiver 326 connects to MoCA controller 328 and also connects to transport multiplexer 362. MoCA controller 328 connects to flipflop 330 and also flipflip 332. Flipflop 330 and flipflop 332 each connect to register 334 and register 336. Register 334 and register 336 each connect to controller 350.

The Ethernet signal interface for signal receiving device, using a high performance twisted pair cable (e.g., Category-5 cable), is connected to Ethernet connector 340. Ethernet connecter 340 includes a magnetics interface 342 for accepting a Registered jack (RJ) 45 physical connector. The magnetics interface 342 connects to Ethernet communications processor 360. Ethernet communications processor 360 connects to transport multiplexer 362 and also connects to controller 350. Controller 350 connects to register 352 as well as register 354. Register 352 and register 354 each connect to flip flop 356 and flipflop 358. Flipflop 356 and flipflop 358 each connect to indicator light 344 and indicator light 346, located in Ethernet connector 340. Indicator light 344 and indicator light 346 both connect to a 3.3 volt direct current (DC) power source (not shown).

Controller 350 in signal receiving device 320 also connects to transport multiplexer 362. Transport multiplexer 362 connects to audio/video processor 364. Audio/video multiplexer 364 connects to audio/video output 366. Audio/video output 366 provides audio and/or video signals externally from signal receiving device 320 to display device 370. Transport multiplexer 362 also connects to hard disk drive 380.

Satellite receiving dish/circuit 302 operates in a manner similar to ODU 201 described in FIG. 2. The broadcast signals from satellite receiving dish/circuit 302, occupying the frequency range from 950 MHz to 2,150 MHz, are combined with signals from a MoCA network device 304, occupying the frequency range from 475 MHz to 625 MHz, in splitter 306. Splitter 306 is a three terminal, or three connection, bi-directional signal processing device. Splitter 306 includes two first terminals having separate interfaces and a common terminal that contains signals interfaced to and from the two first terminals. Splitter 306 may be construction using a number of known passive and/or active circuit elements configurations. MoCA network device 304 may be a second signal receiving device (e.g., set top box, television, and the like) or may be a network communications device (e.g., gateway, router, computer, and the like).

The combined signal from splitter 306 interfaces to signal receiving device 320 at diplexer 322. It is important to note that the MoCA network signal is typically bi-directional. The signal may include a received portion that is provided from the MoCA network to signal receiving device 320, and a transmitted portion that is provided from signal receiving device 320 to the MoCA network. The broadcast signal from satellite receiving dish/circuit 302 may be one-directional and provided to signal receiving device 320. In some embodiments, a control signal (e.g., the control signal from ODU control 232 described in FIG. 2) may be provided from signal receiving device 320 to satellite receiving dish/circuit 302.

Diplexer 322, satellite tuner demodulator 324, and MoCA transceiver 326 operate in a manner similar to that described in FIG. 2 and will not be further described here. Furthermore, transport multiplexer 362 and audio/video processor 364 include functions and operations similar to those found in transport decoder 208 and/or transport decoder 214 described in FIG. 2. Audio/video output 366 also operates in a manner similar to audio/video output 226 described in FIG. 2 and will not be further described here.

MoCA controller 328 includes various MoCA control functions described in FIG. 2, including adjustment of the received and transmitted signals. In addition, MoCA controller 328 determines and identifies status information related to the operation of signal receiving device 320 when it is connected to the MoCA network. MoCA controller 328 includes interfaces for controlling one or more status indicator registers 334 and 336 through flipflops 330 and 332. These status registers 334 and 336 operate in conjunction with the MoCA connection, or link, status and MoCA activity status determined and monitored by MoCA controller 328. In one embodiment, MoCA controller 328 provides MoCA link status to register 334 through flipflop 330 and MoCA activity status to register 336 through flipflop 332.The registers 334 and 336 may be included in a larger memory structure, such as memory 230 described in FIG. 2. The signals in status registers 334 and 336 are available and provided to the controller 350.

The Ethernet network includes an interface from Ethernet connector 340 in signal receiving device 320 to an Ethernet switch/router 312. Ethernet switch/router 312 identifies, manages, and routes the packets of data transmitted through the Ethernet network. One or more of these packets are sent to and received from Ethernet network device 310. Ethernet network device 310 may be a network communications device (e.g., gateway, router, computer, and the like) or may be a second signal receiving device (e.g., set top box, television, and the like).

Ethernet connector 320 receives and sends the Ethernet format communication signals between the external network and Ethernet communications processor 360 through magnetics interface 342. Magnetics interface 342 may include a physical connector interface (e.g., RJ-45) and further may include some signal conditioning and isolation components including, but not limited to, ferrites, transformers, inductors, resistors, and capacitors. In addition, Ethernet connector 220 includes two indicator lights, or LEDs, labeled indicator light 344 and indicator light 346. These indicator lights 344 and 346 provide the visual status indication to a user based on a state (e.g., set, reset) provided from registers 352 and 354 through flipflops 356 and 358. A resistive connection is provided between flipflops 356 and 358 indicator lights 344 and 346 to improve operational performance. In a preferred embodiment, one end of each indicator lights 344 and 346 is connected to a 3.3 volt voltage source. Each indicator lights 344 and 346 illuminates when the flipflop 356 and 358 connected to each indicator light 344 and 346 is at low potential (e.g., ground) state. The indicator lighter 344 and 346 goes dark when the flipflop 356 and 358 is either at a high potential (e.g., 3.3 volts) state or a high impedance state.

Ethernet communications processor 360 processes Ethernet communications packets that are received or transmitted by signal receiving device 320. Ethernet communications processor 360 may parse the incoming packets to determine packets containing data, audio, video, and/or control information. Ethernet communications processor 360 further may sort and construct audio and video program streams and provide these streams as transport streams to transport multiplexer 362. Further, Ethernet communications processor may receive transport streams (e.g., transport streams from MoCA transceiver 326 or Satellite tuner demodulator 324) from transport multiplexer 362 and convert these streams into Ethernet packets. These packets may be transmitted through Ethernet connecter 340 to other devices on the Ethernet network (e.g., Ethernet network device 310).

Controller 350 may include functions and operations similar to those included in controller 216 described in FIG. 2. In addition, controller 350 provides operational control for the Ethernet and MoCA network interfaces. Controller 350 exchanges data and control information with Ethernet communications processor and also provides control information for the switching and stream management in transport multiplexer 362. In addition, controller 350 determines and identifies status information related to operation of signal receiving device 320 connected to the Ethernet network based on information from the Ethernet communication processor 360.

Controller 350 also includes a set of interfaces and input/output (I/O) ports for monitoring and controlling registers 334, 336, 352, and 354. Controller 350 provides the control information for indicator lights 344 and 346 through registers 352 and 354 respectively. These status registers 352 and 354 may operate in conjunction with the Ethernet connection, or link, status and Ethernet activity status determined and monitored by controller 350 through Ethernet communications processor 360. Status registers 352 and 354 may additionally operate in conjunction with inputs to controller 350 from registers 334 and 336. As described earlier, these inputs from registers 334 and 336 are related to the MoCA link and MoCA activity status. In a preferred embodiment, controller 350 provides link status for MoCA and/or Ethernet to register 352 and activity status for MoCA and/or Ethernet to register 354. As a result, registers 352 and 354, and the subsequent operation of the indicator lights 344 and 346 in Ethernet connector 340 may be controlled either by the activity on the Ethernet connection and network through Ethernet communications processor 360 or by the activity on the MoCA connection and network through MoCA controller 328. Registers 352 and 354 may be included in a larger memory structure, such as memory 230 described in FIG. 2.

Transport multiplexer 362 includes interfaces for transport streams from satellite tuner demodulator 324, MoCA transceiver 326, and Ethernet communications processor 360. Transport multiplexer 362 may provide some transport decoding along with some audio and video signal decoding. Further, transport multiplexer 362 may route one or more of the received transport streams back to either MoCA transceiver 326 or Ethernet communications processor for transmission onto a network. Transport multiplexer 362 may also provide one or more the streams to audio/video processor 364 for further decoding and processing and eventual delivery to display device 370 through an external interface connected to audio/video output 366.

Hard disk drive 380 may be used for storing transport streams provided from transport multiplexer 362. Transport streams may be stored as part of a recording feature implemented for the receiving system or may be stored as temporary storage prior to delivery to other circuits (e.g., audio/video processor 364, Ethernet communications processor 360, and MoCA transceiver 326). Transport streams that are stored as part of a recording feature may be retrieved for playback through transport multiplexer at any time after the content has been recorded.

The receiving system 300 provides communication status of two communication parameters. First, a status indicator is provided and indicated using indicator light 344 for Link in Ethernet connector 340. The link LED may provide a steady illumination showing that a connection exists between the signal receiving device and an external device. Second, a status indicator for communication activity is provided and indicated using indicator light 346 for Activity in Ethernet connector 340. The activity LED may provide a flashing illumination pattern during the time that communications information (e.g., data, audio, and/or video) is received or transmitted between the signal receiving device 320 through an interface (e.g., Ethernet connector 340) and an externally connected device on the network (e.g., Ethernet network device 310). It is important to note that in other embodiments additional or different communication status indicators may also be provided.

Communication networks, such as those described in FIG. 3, rely on a communication polling system. Devices periodically provide a signal that can be received by any device connected to the network. This signal is used as part of the device initialization and identification process for any newly connected device. In most networks, the polling signal is referred to as a "ping". In one embodiment, automatic connection identification is used for determining the operation of the status indicators. The Ethernet connection interface is polled as to the connection status to an Ethernet network. If this status returns positive, then a Link status is established and the status indicator light for Link is illuminated. If no connection is identified, then the status indicator light is not illuminated.

If the Link status indicator light is illuminated, then a further determination is made as to whether the current device is involved in Ethernet network communication activity. The determination may be done using the ping signal described earlier or through any other communication data that is sent or received by the device. When communication data is sent or received by the device, the status indicator light for Activity may blink or flash at a periodic rate.

The receiving system 300 may use the communication status indicator lights (e.g., link light 344 and activity light 346 in FIG. 3) for two modes of communication status. First, the status indicator lights provide communication status for operation, connection, and communication in a network using Ethernet communications. Second, the status indicators provide communication status for operation, connection, and communication in a network using MoCA communications. It is important to note that each of these networks do not operate using the same physical network or medium. For instance, the MoCA network operates using co-axial cable and the Ethernet network operates on twisted pair cable similar to telephone cable. Further, additional or different modes for the providing communication status, including additional or different networks, may be provided.

In one embodiment, the mode of operation for the status indicator lights may include determining which communication network is currently being used. The Ethernet connection interface is polled as to the connection status to an Ethernet network. If this status returns positive, then a Link status is established and the status indicator lights are used for Ethernet operation. If this status returns negative, then a second polling is checked as to the communication status of the MoCA network if this status returns positive, then a second mode of operation is established and the status indicator lights are used for MoCA operation. If this status returns negative, then the status indicator lights remain unused.

In a further embodiment, an option may exist for establishing the use of the status indicator lights for Ethernet operation unless Ethernet operation does not exist. Further, the function of each indicator light (e.g., link light 344 and activity light 346 in FIG. 3) may be switched or swapped between each of the two different operating modes. In a first mode of operation, the Link indicator light may be held in a steady on state during Ethernet operation and connection while the Activity indicator light may flash indicating communication. In a second mode, the Activity indicator light may be held in a steady state, indicating MoCA operation and connection while the Link indicator light may flash indicating communication on the MoCA network. As a result, a form of simultaneous communication status may be provided for both the Ethernet network and MoCA network.

In yet another embodiment, multi-element and/or multi-color indicator lights may be used for the status indicator lights (e.g., the link light 344 and activity light 346 in FIG. 3) to provide simultaneous communication status for more than network (e.g., Ethernet network and MoCA network). For example, LEDs employing a pair of parallel connected and oppositely oriented elements and having two different emitting colors may be used. The LEDs may be electrically connected such that the Ethernet control signals operate one of the elements while the MoCA controls signals operate the other elements in each of the status indicator lights. For instance, Red LEDs may be used for Ethernet status and green LEDs may be used for MoCA status.

Control of the states for the status indicators, as well as the modes for the communication status, may be performed using one or more methods or processes implemented in hardware, software, or some combination of both. In one embodiment, the method for providing operational status for multiple communications networks may be implemented through a selection process in a user interface. A menu entry may be accessed that allows selection of a mode from several possible operational modes. These modes may include operation for providing communication status for only one of the networks or for selecting one of the networks based on the current use of that network. Further, the menu may allow selection of a mode that allows providing communication status for more than one network simultaneously. The menu may also allow selection of an automatic detection process for determining which of the multiple networks is connected and/or currently active. A process for automatically determining and providing operational status for multiple communications networks is described below.

Figure 4:
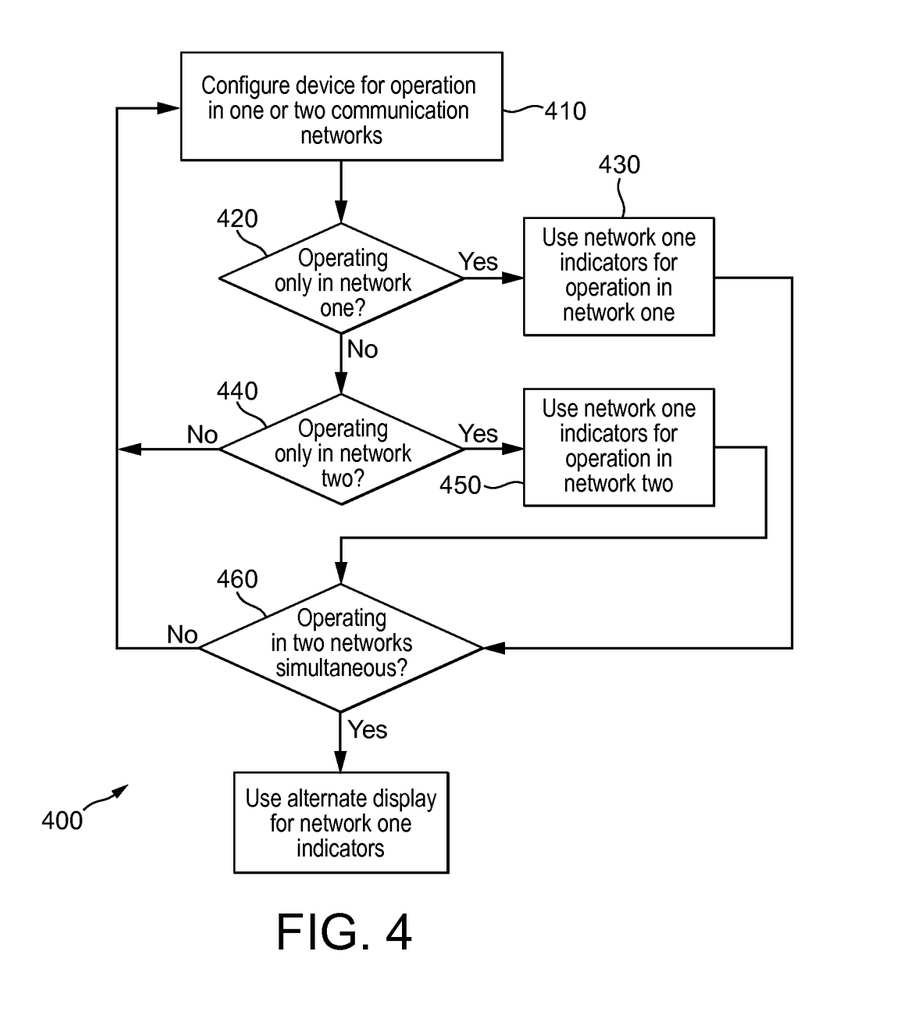
FIG. 4 is a flowchart of an exemplary process for determining the operation of communication status indicators for a device in accordance with the present disclosure.

Turning now to FIG. 4, a flowchart of an exemplary process 400 for determining the operation of communication status indicators for a device in accordance with the present disclosure is shown. Process 400 will primarily be described with respect to receiving system 300 described in FIG. 3. The steps of process 400 may equally apply to the signal receiving device 200 in FIG. 2. Additionally, one or more of the steps in process 400 may be equally applicable to external network receiving device 120 or external network receiving device 130 in FIG. 1. Further, it is important to note that some of the steps described in process 400 may be implemented more than once, or may be implemented recursively. Such modifications may be made without any effect to the overall aspects of process 400.

At step 410, a receiving device, such as receiving device 320, is initiated or configured for operation in one or more local or home communication networks. The configuration may be initiated by a user directly through either a menu entry or other user interface control on the receiving device. The configuration may also be initiated automatically based on a physical connection being made to the network through an interface on the receiving device. In one embodiment, the receiving device is configured to operate in a MoCA network as a result of a change in a menu selection in user interface. In an alternate embodiment, a configuration for operation in an Ethernet network as a result of detecting the presence of an Ethernet cable attached to Ethernet connector 340 in receiving device 320. It is important to note that the receiving device (e.g., receiving device 320) is capable of connecting to, and operating with, more than one local or home communication network. Further, the receiving device may include status indicators normally associated with one communication network interface. Further, the receiving device may not include separate network communication status indicators for each of the communication networks that may connect to, or operate with the receiving device.

At step 420, a determination is made as to whether the receiving device is connected to, or operating with, a first network. In one embodiment, the first network is an Ethernet network connecting an Ethernet network device 310 to receiving device 320 through Ethernet switch/router 312. The Ethernet network physical connects to receiving device 320 at Ethernet connector 340. Further, the receiving device includes one or more status indicators that may be used to indicate the communication activity status for operation in the first network. For example, Ethernet connector 340 includes indicator light 344 and indicator light 346 that identify the Link and Activity status for the Ethernet communication.

If, at step 420 a determination is made that the receiving device is connected to the first network, then at step 430, the one or more status indicators are used in conjunction with communication by the receiving device in the first network. If the determination, at step 420, is made that the receiving device is not connected to the first network, then, at step 440, a determination is made as to whether the receiving device is connected to, or operating with, a second network. In one embodiment, the second network is a MoCA network connecting a MoCA network device 304 to receiving device 320 through splitter 306. As noted earlier, the receiving device does not include any specific status indicators for connection to, or operation with the second network.

If, at step 440 a determination is made that the receiving device is connected to the second network, then at step 450, the one or more status indicators that are normally used for the first network are instead used in conjunction with communication by the receiving device in the second network. In this manner, the status for the second communication network may be monitored or troubleshot using the status indicators usually associated with a different network. It is important to note that the first network and the second network may operate using separate physical media (e.g., co-axial cable, airwaves, phoneline, powerline) and may further operate using different communication protocols and different data communication transfer rates.

After either establishing the use of the status indicators for the first network, at step 430, or establishing the use of the status indicators for the second network, at step 450, a determination is made, at step 460, as to whether the receiving device is connected to, or operating with, both the first network and the second network. If, at step 460 a determination is made that the receiving device is connected to, or operating with, both the first network and the second network, then at step 470, the one or more status indicators that are normally used for the first network are instead used for providing communication status for both networks.

In one embodiment, establishing the use of the status indicators, at step 470, includes switching or swapping the operational modes of the status indicators between the first and second networks. The Link status indicator may be held in a steady on state during operation and/or connection with the first network while the Activity status indicator may flash periodically, indicating communication. The Activity status indicator may be held in a steady state, indicating operation and/or connection with the second network while the Link status indicator may flash periodically, indicating communication on the second network.

In another embodiment, multi-element and/or multi-color indicator lights may be used for the status indicators. For example, LEDs operating as status indicators and employing a pair of parallel connected and oppositely oriented elements and having two different emitting colors may be used. The LEDs may be electrically connected such that the Ethernet control signals operate one of the elements while the MoCA controls signals operate the other elements in each of the status indicator lights. For instance, Red LEDs may be used for the first network and green LEDs may be used for the second network. As a result, simultaneous communication status may be provided for both the first network and the second network.

If, after the determination, at step 440, or the determination, at step 460, the determination is made that the receiving device is not connected to, or operating with either the first network or the second network, process 400 returns to step 410 and awaits a configuration or initialization of the receiving device for one of the networks.

It is important to note that the steps in process 400 describe only a preferred embodiment. In some other embodiments, certain steps in process 400 may be rearranged or may be eliminated. For example, in one embodiment, determination and use in both networks, at steps 460 and 470, may not be used because the receiving device may only be capable of connecting to, or operating with one local or home communication network at a time. Further, additional steps may be added to process 400 in order to accommodate connection to, or operation with more than two local or home communication networks.

The present disclosure describes embodiments for providing status indicators on a device that includes the capability to operate in multiple home communication networks. In particular, the embodiments disclose an apparatus and method for sharing the operation of status indicators used for a first communications network (e.g., an Ethernet network) with a second network (e.g., an Ethernet network). The embodiments use the existing Ethernet "Link" and "Activity" indicator lights (e.g., light emitting diodes (LEDs)) to indicate MoCA "Link" and "Activity" in MoCA mode.

One or more of the present embodiments describe sharing the "link" and "activity" LEDs in the standard Ethernet connector between Ethernet indicator status and MoCA indicator status. The embodiments re-route the control of the Ethernet link and activity LEDs on the Ethernet connector from the standard Ethernet control interface to the MoCA control interface when the MoCA feature is selected. The MoCA and Ethernet features on many signal receiving devices, such as a typical satellite set top box, are mutually exclusive. The set top box may default to Ethernet Mode if an active Ethernet cable is plugged in and the software controls the function of the LEDs on the Ethernet connector accordingly. The sharing, either independently or simultaneously, of the "link" and "activity" LEDs allow for more convenient set up and troubleshooting of the MoCA network operation without the expense and additional space needed for adding two additional LEDs.

Although embodiments which incorporate the teachings of the present disclosure have been shown and described in detail herein, those skilled in the art can readily devise many other varied embodiments that still incorporate these teachings. Having described preferred embodiments of a method and apparatus for managing a media content database on a device (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. An apparatus comprising:
a first transceiver circuit, the first transceiver circuit configured to communicate with a plurality of first devices using a first communication network medium;
a second transceiver circuit, the second transceiver circuit configured to communicate with a plurality of second devices using a second communication network medium,
the first transceiver circuit including a visual indicator representing a status of the first communication network between the apparatus and the plurality of first devices or a status of the second communication network between the apparatus and the plurality of second devices; and
a controller coupled to the first transceiver circuit and the second transceiver circuit, the controller determining the status of the second communication network between the apparatus and the plurality of second devices and providing the status of the second communication network to the visual indicator of the first transceiver circuit, the visual indicator further comprising a first indicator light and a second indicator light, each alternating together with the other between a first operating mode and a second operating mode to display the status of the first communication network or the second communication network,
wherein in the first operating mode, the first indicator light displays steady light for indicating operational status of the first communication network and the second indicator light displays flashing light for indicating communication status of the first communication network, and
wherein in the second operating mode, the first indicator light displays flashing light for indicating communication status of the second communication network and the second indicator light displays steady light for indicating operational status of the second communication network.

2. The apparatus of claim 1, wherein the plurality of first devices is the same as the plurality of second devices.

3. The apparatus of claim 1, wherein the second transceiver circuit includes an input circuit receiving broadcast content.

4. The apparatus of claim 3, wherein the broadcast content is content provided by a satellite broadcast provider.

5. The apparatus of claim 1, wherein at least one of the first indicator light and the second indicator light uses a first color for the first communication network and a second color for the second communication network.

6. The apparatus of claim 1, wherein the second transceiver circuit uses co-axial cable for the second communication network medium.

7. The apparatus of claim 1, wherein the visual indicator representing the status of the first communication network is included as part of a connector for connecting the apparatus to the plurality of first devices.

8. The apparatus of claim 1, wherein the apparatus is a settop box.

9. The apparatus of claim 1, wherein the first transceiver circuit is an Ethernet circuit.

10. The apparatus of claim 1, wherein the second transceiver circuit includes a Multimedia over Cable Alliance circuit.

11. A method comprising:
determining by a controller if a device is operating in a first communication network;
determining by the controller if the device is operating in a second communication network; and
displaying a visual indication that the device is operating in the first communication network or in the second communication network using a visual indicator on the device if the device is operating in the first communication network or in the second communication network, wherein the visual indicator is shared by the first communication network and the second communication network, the visual indicator further comprising a first indicator light and a second indicator light, each alternating together with the other between a first operating mode to display a status of the device operating in the first communication network and a second operating mode to display a status of the device operating in the second communication network,
wherein in the first operating mode, the first indicator light displays steady light for indicating operational status of the device operating in the first communication network and the second indicator light displays flashing light for indicating communication status of the device operating in the first communication network, and
wherein in the second operating mode, the first indicator light displays flashing light for indicating communication status of the device operating in the second communication network and the second indicator light displays steady light for indicating operational status of the device operating in the second communication network.

12. The method of claim 11, wherein at least one of the first indicator light and the second indicator light uses a first color to indicate the operational status in the first communication network and a second color to indicate the communication status in the second communication network.

13. The method of claim 11, wherein the visual indicator is included as part of a connector for connecting the device to the second communication network.

14. The method of claim 11, wherein the device is a settop box.

15. The method of claim 11, wherein the second communication network is an Ethernet communication network and the first communication network is a Multimedia over Cable Alliance network.

16. The method of claim 11, wherein the device is receives broadcast content.

17. The method of claim 16, wherein the broadcast content is content provided by a satellite broadcast provider.

18. The method of claim 11, wherein the first communication network uses co-axial cable.

19. The method of claim 11, wherein the operational status is a link status indicating connectivity and the communication status is an activity status indicating data transfer.

20. A method comprising:
   determining by a controller if a device is operating in a first communication network;
   determining by the controller if the device is operating in a second communication network; and
   displaying a visual indication that the device is operating in the first communication network or in the second communication network using a visual indicator on the device if the device is operating in the first communication network or in the second communication network, wherein the visual indicator is shared by the first communication network and the second communication network, the visual indicator further comprising a first indicator light and a second indicator light, each alternating together with the other between a first operating mode to display a status of the device operating in the first communication network and a second operating mode to display a status of the device operating in the second communication network,
   wherein in the first operating mode, the first indicator light displays steady light for indicating a Link status of the device operating in the first communication network and the second indicator light displays flashing light for indicating an Activity status of the device operating in the first communication network,
   wherein in the second operating mode, the first indicator light displays flashing light for indicating the Activity status of the device operating in the second communication network and the second indicator light displays steady light for indicating the Link status of the device operating in the second communication network, and
   said Link status representing connectivity and said Activity status representing data transfer.

21. The apparatus of claim 1, wherein the operational status is a Link status indicating connectivity and the communication status is an Activity status indicating data transfer.

22. An apparatus comprising:
   a first transceiver circuit, the first transceiver circuit configured to communicate with a plurality of first devices using a first communication network medium;
   a second transceiver circuit, the second transceiver circuit configured to communicate with a plurality of second devices using a second communication network medium,
   the first transceiver circuit including a visual indicator representing a status of the first communication network between the apparatus and the plurality of first devices or a status of the second communication network between the apparatus and the plurality of second devices; and
   a controller coupled to the first transceiver circuit and the second transceiver circuit, the controller determining the status of the second communication network between the apparatus and the plurality of second devices and providing the status of the second communication network to the visual indicator of the first transceiver circuit, the visual indicator further comprising a first indicator light and a second indicator light, each alternating together with the other between a first operating mode and a second operating mode to display the status of the first or second communication network,
   wherein in the first operating mode, the first indicator light displays steady light for indicating a Link status of the first communication network and the second indicator light displays flashing light for indicating an Activity status of the first communication network,
   wherein in the second operating mode, the first indicator light displays flashing light for indicating the Activity status of the second communication network and the second indicator light displays steady light for indicating the Link status of the second communication network, and
   said Link status representing connectivity and said Activity status representing data transfer.

* * * * *